N. CLUTE.
Dumping-Wagon.
No 66,076. Patented June 25, 1867.
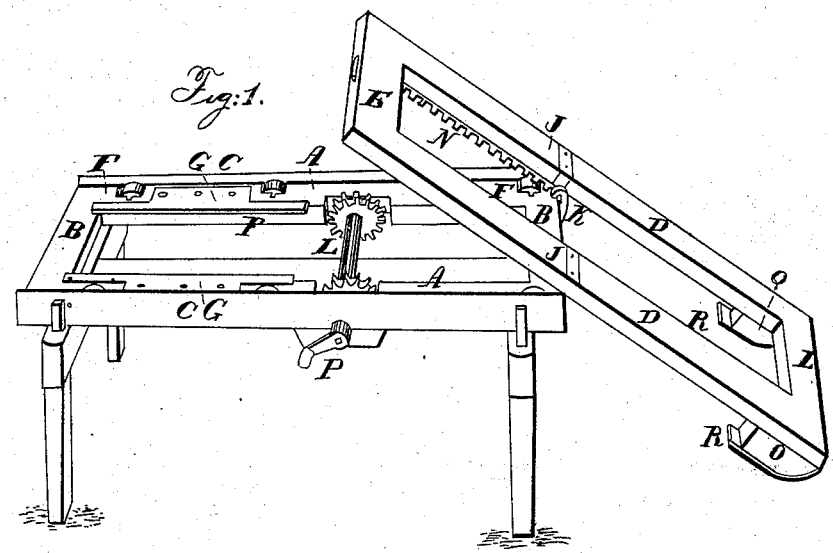
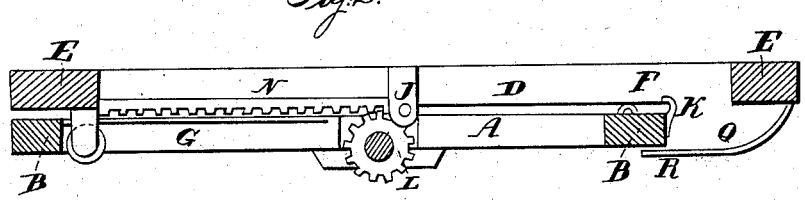
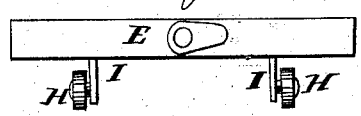
Witnesses
J. E. Dennis
Chas. Hodaway
Inventor
Nicholas Clute
By his Attorney J. Dennis Jr
N. PETERS, PHOTO-LITHOGRAPHER, WASHINGTON, D. C.

United States Patent Office.

NICHOLAS CLUTE, OF SCHENECTADY, NEW YORK.

Letters Patent No. 66,076, dated June 25, 1867.

IMPROVEMENT IN DUMPING-WAGONS.

*The Schedule referred to in these Letters Patent and making part of the same.*

TO ALL WHOM IT MAY CONCERN:

Be it known that I, NICHOLAS CLUTE, of the city and county of Schenectady, State of New York, have invented certain new and useful Improvements in Dumping-Wagons; and I do hereby declare the following description and accompanying drawings are sufficient to enable any person skilled in the art or science to which it most nearly appertains to make and use my said invention or improvements without further invention or experiment.

The nature of my invention and improvements consists in fastening some metal plates to the bed frame in connection with some rollers fastened to the movable body or frame, so as to traverse under said plates and hold the body or movable frame down to the bed, until it is moved back a proper distance to tilt and dump the load; and in some stops at the rear end of the movable frame, to stop it when it arrives to a proper position to receive the load, which stops are provided with catches to lock the movable to the bottom frame. Also, in connection with the foregoing, the arranging of a crank-shaft and pinions on the bed frame, said pinions to act on racks on the movable frame, and traverse it to be dumped, and return to its position on the bed to receive the load. In the accompanying drawings—

Figure 1 is a perspective view of the bed frame of a wagon with my improvements, and the movable frame in a position to dump a load.

Figure 2 is a vertical section, showing the movable frame in the position to receive a load.

Figure 3 is the fore end of the movable frame and rollers.

In these drawings, A A are the side bars of the bed or stationary frame of a dumping-wagon, intended to be fastened to the rocker and rear axle of a wagon. These bars are connected at their ends by the end bars B B, making a strong frame. The side bars A have some boards, C C, fastened to them, which project up each side of the bed frame to hold the movable frame in place right over it. The movable frame or body of the wagon, which is to receive the load, consists of the side rails D D and end rails E E, fastened together, making a strong frame, which is arranged to traverse and lie on the bed frame between the boards C C. In order to facilitate the movement of the movable frame on the bed frame, I fit a series of friction-rollers, F F, into the bars A for the movable frame to traverse on. And the metal plates G G are fastened to the bars A, as shown in fig. 1, for the rollers H H to traverse under and hold the fore end of the movable frame down, until it is moved back far enough to tilt and dump the load, the rollers H H turning on studs in the brackets I I, fastened to the fore end E, as shown in fig. 3. The pivots J J are fastened to the rails D, and catch under the hooks K, (fastened to the rear end of the bed frame,) when the movable frame is tilted to dump the load, and prevents the movable frame sliding entirely off of the bed frame. The shaft L is fitted to turn in boxes fastened to the bars A, and has two pinions on it which act on the racks N fastened to the rails D, when the shaft is turned by the crank P on the shaft to traverse the movable frame. The stops Q Q are fastened to the rear ends of the rails D to stop the frame when it is moved forward to its proper place to receive a load. And these stops are provided with catches R R to catch under the bed frame and hold the rear end of the movable frame down.

Having described my invention and improvements in dumping-wagons—

I claim the plates on the bed frame, in combination with the rollers connected to the body or movable frame, or their equivalents, substantially as described.

I also claim the stops at the rear end of the movable frame, provided with catches to lock it to the bottom frame, substantially as described.

I also claim, in combination with the plates and rollers above claimed, the crank-shaft, pinion, and rack fastened to the movable frame.

NICHOLAS CLUTE.

Witnesses:
J. DENNIS, Jr.,
T. C. CONNOLLY.